United States Patent
Yang et al.

(10) Patent No.: US 8,838,785 B2
(45) Date of Patent: Sep. 16, 2014

(54) METHOD AND SYSTEM FOR REGISTERING DEEP PACKET INSPECTION (DPI) DEVICE

(75) Inventors: Bo Yang, Shenzhen (CN); Xiaoli Song, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 401 days.

(21) Appl. No.: 13/258,436

(22) PCT Filed: Apr. 9, 2010

(86) PCT No.: PCT/CN2010/071648
§ 371 (c)(1),
(2), (4) Date: Jan. 6, 2012

(87) PCT Pub. No.: WO2011/009311
PCT Pub. Date: Jan. 27, 2011

(65) Prior Publication Data
US 2012/0110169 A1    May 3, 2012

(30) Foreign Application Priority Data

Jul. 24, 2009    (CN) .......................... 2009 1 0089853

(51) Int. Cl.
*G06F 15/173*    (2006.01)
*H04L 29/06*    (2006.01)
*H04L 12/24*    (2006.01)
*H04L 12/26*    (2006.01)

(52) U.S. Cl.
CPC ................ *H04L 12/24* (2013.01); *H04L 63/20* (2013.01); *H04L 41/00* (2013.01); *H04L 63/0245* (2013.01); *H04L 41/085* (2013.01); *H04L 41/0893* (2013.01); *H04L 43/028* (2013.01); *H04L 63/0209* (2013.01)
USPC .......................................... 709/224; 709/223

(58) Field of Classification Search
CPC .... H04L 43/028; H04L 41/00; H04L 63/0245

USPC .................................................. 709/223, 224
See application file for complete search history.

(56) References Cited

U.S. PATENT DOCUMENTS 6,981,036 B1    12/2005 Hamada
7,836,488 B2 *  11/2010 Lor et al. .......................... 726/3
(Continued)

FOREIGN PATENT DOCUMENTS

CN    1822541 A    8/2006
CN    1852187 A    10/2006
(Continued)

OTHER PUBLICATIONS

International Search Report on international application No. PCT/CN2010/071648, mailed on Jul. 15, 2010.
English Translation of the Written Opinion of the International Search Authority in international application No. PCT/CN2010/071648, mailed on Jul. 15, 2010.
(Continued)

*Primary Examiner* — Mohamed Wasel
(74) *Attorney, Agent, or Firm* — Oppedahl Patent Law Firm LLC

(57) ABSTRACT

A method and system for registering a Deep Packet Inspection (DPI) device. The method comprises: a DPI device sends registration information to a linkage information control center and requests to register with a network; when the DPI device is valid, the linkage information control center classifies the DPI device into a corresponding device group, and reports the registration information to a DPI linkage policy decision module; the DPI linkage policy decision module distributes a corresponding performing policy and/or identifying template to the DPI device according to the registration information; and the linkage information control center notifies a DPI information collection database to add an information item corresponding to the DPI device, to complete the registration of the DPI device.

16 Claims, 3 Drawing Sheets

(56) References Cited

U.S. PATENT DOCUMENTS

| | | |
|---|---|---|
| 2003/0169859 A1 | 9/2003 | Strathmeyer et al. |
| 2005/0055399 A1 | 3/2005 | Savchuk |
| 2008/0109512 A1 | 5/2008 | Zhou et al. |
| 2008/0201772 A1 | 8/2008 | Mondaeev et al. |
| 2009/0138945 A1 | 5/2009 | Savchuk |
| 2009/0172171 A1* | 7/2009 | Amir .............................. 709/227 |
| 2010/0098060 A1 | 4/2010 | Strathmeyer et al. |
| 2010/0106966 A1 | 4/2010 | Santos et al. |

FOREIGN PATENT DOCUMENTS

| | | |
|---|---|---|
| EP | 1059766 A2 | 12/2001 |
| WO | 2008095291 A1 | 8/2008 |

OTHER PUBLICATIONS

Supplementary European Search Report in European application No. 10801871.4, mailed on Jun. 18, 2013. (5 pages—see entire document).

* cited by examiner

METHOD AND SYSTEM FOR REGISTERING DEEP PACKET INSPECTION (DPI) DEVICE

TECHNICAL FIELD

The present invention relates to a management technology of a Deep Packet Inspection (DPI) device in network communication, in particular to a method and a system for registering a DPI device.

BACKGROUND

As the deep development of Internet technology and applications thereof, services such as Point-to-Point (P2P), online instant messaging, online game, IP telephony and IP television have been widespread. Theoretically, such services have insatiable demand on bandwidth, they not only make the originally smooth networks become more and more congested, but also vastly change the flow model of the networks and greatly increase the operating cost. In order to deeply analyze and control the network flow in the level of the user and application, currently a lot of Deep Packet Inspection (DPI) devices have been proposed to work out more reasonable solutions of expansion, optimization and management of the network, and to relieve investment and maintenance pressures resulted from the network expansion.

As the increase of DPI devices, management and scheduling of the DPI devices become an urgent problem to be settled down. It is an inevitable trend to classify DPI identification devices and DPI control devices into an identification device group and a control device group and manage the DPI device group as a whole. In order to uniformly manage the DPI device group, the premise is that the newly added DPI devices including DPI control devices and DPI identification devices needs to be registered with corresponding administrative organizations. However, an effective DPI device registration solution has not been provided in the prior art, which brings inconvenience to actual application.

SUMMARY

Therefore, the main purpose of the present invention is to provide a method and system for registering a DPI device, to realize the registration of the DPI device, thereby facilitating uniform management of the DPI device.

In order to achieve the above purpose, the technical solution of the present invention is realized as follows.

The present invention provides a method for registering a Deep Packet Inspection (DPI) device, and the method includes:

a DPI device sends registration information to a linkage information control center and requests to register with a network;

the linkage information control center classifies the DPI device into a corresponding device group when verifying according to the registration information that the DPI device is valid, and reports the registration information to a DPI linkage policy decision module;

the DPI linkage policy decision module distributes a corresponding performing policy and/or identifying template to the DPI device according to the registration information; and the linkage information control center notifies a DPI information collection database to add an information item corresponding to the DPI device.

The registration information may include: device information, status information and routing information.

The step of classifying the DPI device into the corresponding device group may include: if the DPI device is a DPI control device, it is classified into a corresponding DPI control device group; and if the DPI device is a DPI identification device, it is classified into a corresponding DPI identification device group.

The method further includes: the linkage information control center refuses the registration of the DPI device when verifying that the DPI device is invalid, and returns a registration failure message to the DPI device.

The step that the DPI device sends the registration information to the linkage information control center may include: the DPI device initiatively sends the registration information to the linkage information control center; or the DPI device sends the registration information in response to a request of the linkage information control center.

The step of distributing the corresponding performing policy and/or identifying template to the DPI device may include:

a corresponding performing policy is distributed if the DPI device is a DPI control device; and a corresponding identifying template is distributed if the DPI device is a DPI identification device.

The present invention also provides a system for registering a Deep Packet Inspection (DPI) device, and the system includes: a DPI device, a linkage information control center, a DPI linkage policy decision module and a DPI information collection database, wherein the DPI device is configured to send registration information to the linkage information control center and request to register with a network; and further configured to receive an performing policy and/or identifying template distributed by the DPI linkage policy decision module;

the linkage information control center is configured to classify the DPI device into a corresponding device group when verifying that the DPI device is valid according to the registration information, and report the registration information to the DPI linkage policy decision module;

the DPI linkage policy decision module is configured to distribute a corresponding performing policy and/or identifying template to the DPI device according to the registration information; and the DPI information collection database is configured to add an information item corresponding to the DPI device according to a notice from the linkage information control center.

The registration information may include: device information, status information and routing information.

The linkage information control center may be further configured to classify a DPI control device into a corresponding DPI control device group and classify a DPI identification device into a corresponding DPI identification device group.

The linkage information control center may be further configured to refuse the registration of the DPI device when verifying that the DPI device is invalid, and return a registration failure message to the DPI device.

In the method and system for registering the DPI device according to the present invention, the DPI device sends the registration information to the linkage information control center and requests to register with the network; when verifying that the DPI device is valid according to the registration information, the linkage information control center classifies the DPI device into a corresponding device group, and reports the registration information to the DPI linkage policy decision module; the DPI linkage policy decision module distributes a corresponding performing policy and/or identifying template to the DPI device according to the registration information; and the linkage information control center notifies the DPI information collection database to add the information item corresponding to the DPI device, to complete the registration of the DPI device. Through the present invention, the registration of the DPI device is realized, and the uniform management of the DPI device is facilitated.

DETAILED DESCRIPTION

The technical solution of the present invention will be further described in details below with reference to the drawings and specific embodiments.

Figure 1:
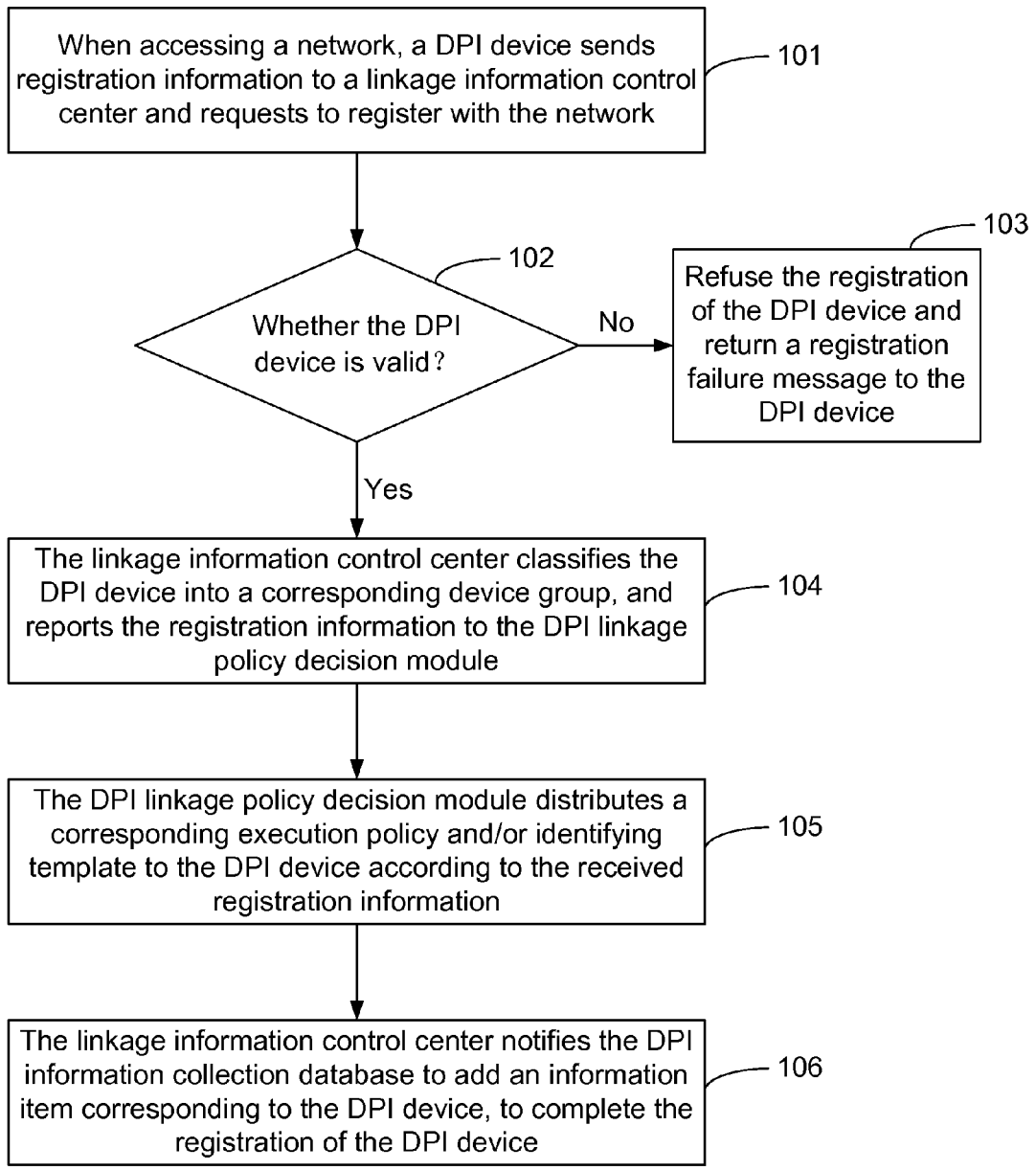
FIG. 1 shows a flow chart of a method for registering a DPI device according to the present invention.

As shown in FIG. 1, the method for registering a DPI device according to the present invention mainly includes the following steps.

Step 101: when accessing a network, a DPI device sends registration information to a linkage information control center and requests to register with a network.

In practical application, when a DPI device (a DPI identification device or a DPI control device) accesses a network, the DPI device initiatively sends a registration request to a linkage information control center, wherein the request contains registration information; of course, the DPI device may also be required to provide registration information after the linkage information control center initiatively finds the access of the DPI device. The registration information may include: device information, status information, routing information and so on.

Step 102: the linkage information control center verifies whether the DPI device is valid according to the received registration information and a preset rule, wherein if it is, step 104 is executed, otherwise, step 103 is executed.

Whether the DPI device is valid depends on the policy of the operator, for example, if the policy specifies that only DPI devices of an operator A and an operator B are valid, the added devices of other operators are invalid; or, if the policy specifies that only DPI devices of a certain model number are valid, DPI devices of other model numbers are invalid.

Step 103: the linkage information control center refuses the registration of the DPI device when verifying that the DPI device is invalid, and returns a registration failure message to the DPI device.

Step 104: the linkage information control center classifies the DPI device into a corresponding device group, and reports the registration information to the DPI linkage policy decision module.

Specifically, if the DPI device is a DPI control device, it is classified into a corresponding DPI control device group; and if the DPI device is a DPI identification device, it is classified into a corresponding DPI identification device group. An identifier of the DPI device can be used to determine whether the device is a DPI control device or DPI identification device. Besides, when reporting the registration information to the DPI linkage policy decision module, the linkage information control center also needs to report the type information of the DPI device to the DPI linkage policy decision module.

Step 105: the DPI linkage policy decision module distributes a corresponding performing policy and/or identifying template to the DPI device according to the received registration information.

Specifically, according to the type information of the DPI device reported by the linkage information control center, if the DPI device is a DPI control device, a corresponding performing policy is distributed; if the DPI device is a DPI identification device, a corresponding identifying template is distributed; and if the DPI device has functions of both the DPI control device and the DPI identification device, a corresponding performing policy and a corresponding identifying template is distributed. Correspondingly, in step 104, when the DPI device which has functions of both the DPI control device and the DPI identification device is classified into a device group, it is required to classify the DPI device into a DPI control device group and also into a DPI identification device group.

Step 106: the linkage information control center notifies the DPI information collection database to add an information item corresponding to the DPI device, to complete the registration of the DPI device.

Figure 2:
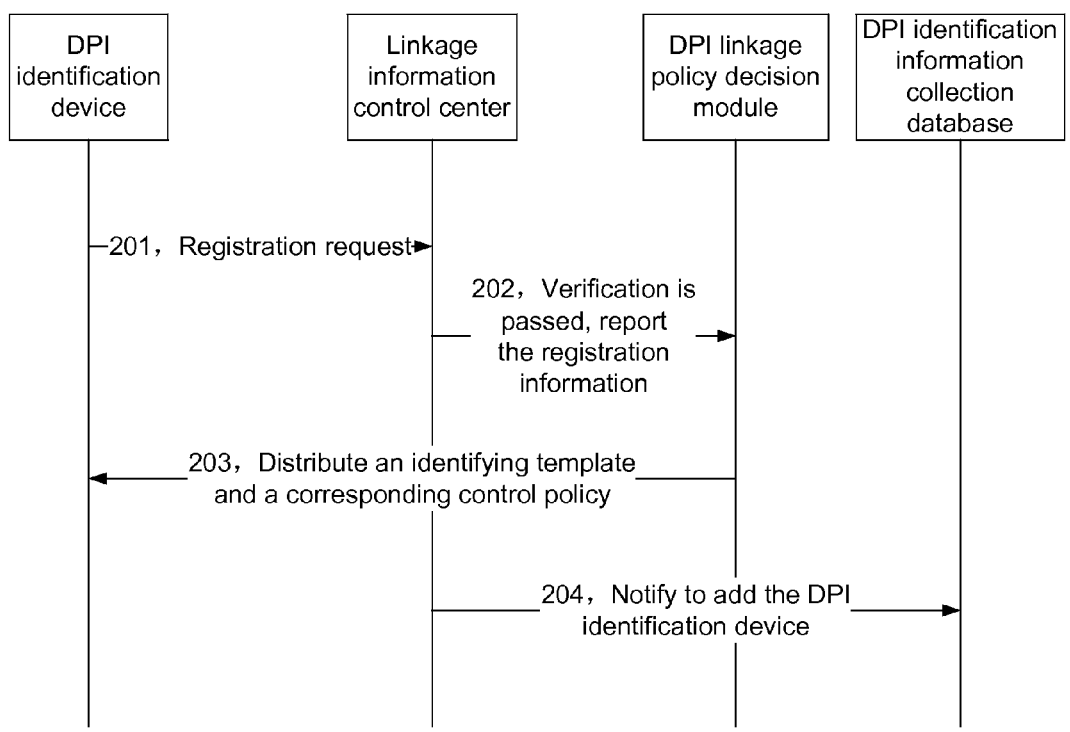
FIG. 2 shows a flow chart of the method for registering the DPI identification device according to the present invention.

The registration process of a DPI identification device will be taken as an example for further detailed description. As shown in FIG. 2, the method for registering a DPI identification device mainly includes the following steps.

Step 201: when accessing a network, a DPI identification device sends a registration request to a linkage information control center, wherein the request contains registration information, including device information, status information and routing information.

Step 202: the linkage information control center acquires that the DPI identification device is a valid DPI identification device according to the received registration information and the preset rule, adds the DPI identification device to the DPI identification device group, and reports the registration information to the DPI linkage policy decision module in this layer.

Step 203: the DPI linkage policy decision module in the current layer distributes an identifying template and a corresponding control policy to the DPI identification device according to the received registration information.

Step 204: the linkage information control center notifies the DPI identification information collection database to add the information item corresponding to the DPI identification device, and saves the device information, status information and routing information contained in the registration information in the information item; so far, the DPI identification device has been registered successfully.

The registration process of a DPI control device is similar to that as shown in FIG. 2 and will not be described again here. The only difference is that the DPI control device is added into a DPI control device group and the DPI linkage policy decision module in the current layer distributes a corresponding performing policy to the DPI control device.

Figure 3:
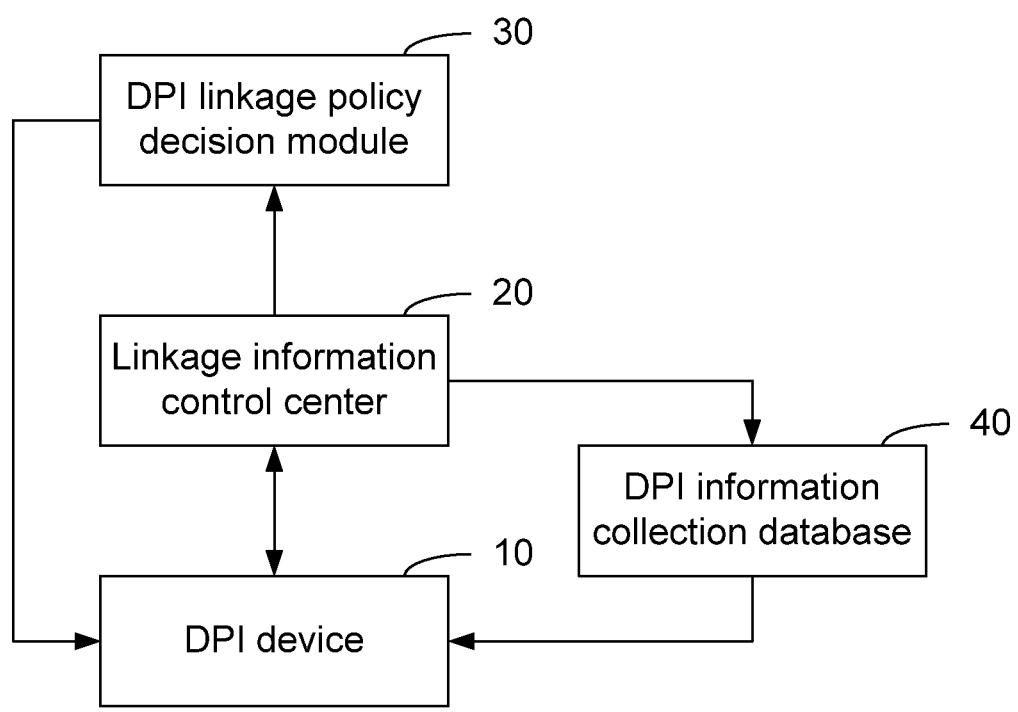
FIG. 3 shows a structural diagram of a system for registering the DPI device according to the present invention.

In order to realize the method for registering a DPI device, the present invention also provides a system for registering a DPI device, as shown in FIG. 3, and the system includes: a DPI device 10, a linkage information control center 20, a DPI linkage policy decision module 30 and a DPI information collection database 40.

Wherein the DPI device 10 is configured to send registration information to the linkage information control center 20 and request to register with a network; the DPI device 10 may initiatively send the registration information to the linkage information control center 20, or the DPI device may send the registration information in response to a request of the linkage information control center 20. The DPI device 10 is further configured to receive the performing policy and/or identifying template distributed by the DPI linkage policy decision module 30.

The linkage information control center 20 is configured to classify the DPI device 10 into a corresponding device group when verifying that the DPI device is valid according to the registration information, and reporting the registration information to the DPI linkage policy decision module 30. Specifically, if the DPI device 10 is a DPI control device, it is classified into a corresponding DPI control device group; and if the DPI device 10 is a DPI identification device, it is classified into a corresponding DPI identification device group. The linkage information control center 20 is also configured to refuse the registration of the DPI device 10 when verifying that the DPI device 20 is invalid, and return a registration failure message to the DPI device 10.

The DPI linkage policy decision module 30 is configured to distribute a corresponding performing policy and/or identifying template to the DPI device 10 according to the registration information reported by the linkage information control center 20. Specifically, if the DPI device 10 is a DPI control device, a corresponding performing policy is distributed; and if the DPI device 10 is a DPI identification device, a corresponding identifying template is distributed; and if the DPI device 10 has functions of both the DPI control device and the DPI identification device, a corresponding performing policy and a corresponding identifying template are distributed.

The DPI information collection database 40 is configured to add the information item corresponding to the DPI device 10 according to a notice from the linkage information control center 20, and save the device information, status information and routing information contained in the registration information in the information item.

Above contents are only preferred embodiments of the present invention and are not intended to limit the protection scope of the present invention.

The invention claimed is:

1. A method for registering a Deep Packet Inspection (DPI) device, wherein each newly added DPI device has to be registered with a network, such that all DPI devices can be managed as a whole, wherein each DPI device is operable to analyze and control a network flow in a level of user and application, the method comprising:
    sending, by a DPI device, registration information to a linkage information control center and requesting to register with the network;
    determining, by the linkage information control center, a type of the DPI device when verifying according to the registration information and a policy of an operator that the DPI device is valid, and reporting the registration information to a DPI linkage policy decision module;
    distributing, by the DPI linkage policy decision module, a corresponding performing policy and/or identifying template to the DPI device according to the registration information; and
    notifying, by the linkage information control center, a DPI information collection database to add an information item corresponding to the DPI device,
    wherein all the DPI devices are managed centrally by using their respective information items in the DPI information collection database.

2. The method for registering a DPI device according to claim 1, wherein the registration information comprises: device information, status information and routing information.

3. The method for registering a DPI device according to claim 1, wherein the step of determining the type of the DPI device comprises: determining whether the DPI device is a DPI control device or a DPI identification device, if the DPI device is a DPI control device, classifying the DPI device into a corresponding DPI control device group; and if the DPI device is a DPI identification device, classifying the DPI device into a corresponding DPI identification device group.

4. The method for registering a DPI device according to claim 1, further comprising: refusing, by the linkage information control center, the registration of the DPI device when verifying that the DPI device is invalid, and returning a registration failure message to the DPI device.

5. The method for registering a DPI device according to claim 1, wherein the step of sending the registration information to the linkage information control center by the DPI device comprises: initiatively sending, by the DPI device, the registration information to the linkage information control center; or sending, by the DPI device, the registration information in response to a request of the linkage information control center.

6. The method for registering a DPI device according to claim 1, wherein the step of distributing a corresponding performing policy and/or identifying template to the DPI device comprises:
    distributing a corresponding performing policy if the DPI device is a DPI control device; and distributing a corresponding identifying template if the DPI device is a DPI identification device.

7. A system for registering a Deep Packet Inspection (DPI) device, where in each newly added DPI device has to be registered with a network, such that all DPI devices can be managed as a whole, and each DPI device is operable to analyze and control a network flow in a level of user and application, the system comprising: a DPI device, a linkage information control center, a DPI linkage policy decision module and a DPI information collection database, wherein
    the DPI device is configured to send registration information to the linkage information control center and request to register with the network; and further configured to receive an performing policy and/or identifying template distributed by the DPI linkage policy decision module;
    the linkage information control center is configured to determine a type of the DPI device when verifying that the DPI device is valid according to the registration information and a policy of an operator, and report the registration information to the DPI linkage policy decision module;
    the DPI linkage policy decision module is configured to distribute a corresponding performing policy and/or identifying template to the DPI device according to the registration information; and
    the DPI information collection database is configured to add an information item corresponding to the DPI device according to a notice from the linkage information control center,
    wherein all the DPI devices are managed centrally by using their respective information items in the DPI information collection database.

8. The system for registering a DPI device according to claim 7, wherein the registration information comprises: device information, status information and routing information.

9. The system for registering a DPI device according to claim 7, wherein the linkage information control center is further configured to determine whether the DPI device is a DPI control device or a DPI identification device, classify a DPI control device into a corresponding DPI control device group and classify a DPI identification device into a corresponding DPI identification device group.

10. The system for registering a DPI device according to claim 7, wherein the linkage information control center is further configured to refuse the registration of the DPI device when verifying that the DPI device is invalid, and return a registration failure message to the DPI device.

11. The method for registering a DPI device according to claim 2, wherein the step of determining the type of the DPI device comprises: if the DPI device is a DPI control device, classifying the DPI device into a corresponding DPI control device group; and if the DPI device is a DPI identification device, classifying the DPI device into a corresponding DPI identification device group.

12. The method for registering a DPI device according to claim 2, further comprising: refusing, by the linkage information control center, the registration of the DPI device when verifying that the DPI device is invalid, and returning a registration failure message to the DPI device.

13. The method for registering a DPI device according to claim 2, wherein the step of sending the registration information to the linkage information control center by the DPI device comprises: initiatively sending, by the DPI device, the registration information to the linkage information control center; or sending, by the DPI device, the registration information in response to a request of the linkage information control center.

14. The method for registering a DPI device according to claim 2, wherein the step of distributing a corresponding performing policy and/or identifying template to the DPI device comprises:
    distributing a corresponding performing policy if the DPI device is a DPI control device; and distributing a corresponding identifying template if the DPI device is a DPI identification device.

15. The system for registering a DPI device according to claim 8, wherein the linkage information control center is further configured to determine whether the DPI device is a DPI control device or a DPI identification device, classify a DPI control device into a corresponding DPI control device group and classify a DPI identification device into a corresponding DPI identification device group.

16. The system for registering a DPI device according to claim 8, wherein the linkage information control center is further configured to refuse the registration of the DPI device when verifying that the DPI device is invalid, and return a registration failure message to the DPI device.

\* \* \* \* \*